US012782547B2

(12) United States Patent
Tan

(10) Patent No.: US 12,782,547 B2
(45) Date of Patent: Nov. 3, 2026

(54) SCREENING DEVICE AND METHOD FOR SCREENING A PERSON

(71) Applicant: SCARABEE SYSTEMS & TECHNOLOGY B.V., Hoofddorp (NL)

(72) Inventor: Michael Kim Tan, Hoofddorp (NL)

(73) Assignee: SCARABEE SYSTEMS & TECHNOLOGY B.V., Hoofddorp (NL)

(*) Notice: Subject to any disclaimer, the term of this patent is extended or adjusted under 35 U.S.C. 154(b) by 544 days.

(21) Appl. No.: 18/028,940

(22) PCT Filed: Sep. 27, 2021

(86) PCT No.: PCT/EP2021/076531
§ 371 (c)(1),
(2) Date: Mar. 28, 2023

(87) PCT Pub. No.: WO2022/064047
PCT Pub. Date: Mar. 31, 2022

(65) Prior Publication Data

US 2023/0375695 A1 Nov. 23, 2023

(30) Foreign Application Priority Data

Sep. 28, 2020 (NL) ...................................... 2026564

(51) Int. Cl.
*G01S 13/88* (2006.01)
*A43B 3/44* (2022.01)
(Continued)

(52) U.S. Cl.
CPC .............. *G01S 13/887* (2013.01); *A43B 3/44* (2022.01); *A43B 3/48* (2022.01); *G06T 7/20* (2013.01); *G06V 40/20* (2022.01)

(58) Field of Classification Search
CPC . G01S 13/887; G01S 7/04; G01S 7/41; G01S 13/867; G01S 13/89; A43B 3/44;
(Continued)

(56) References Cited

U.S. PATENT DOCUMENTS

| | | | |
|---|---|---|---|
| 5,124,554 | A | 6/1992 | Fowler et al. |
| 7,660,388 | B2 | 2/2010 | Gray |

(Continued)

FOREIGN PATENT DOCUMENTS

| | | | | |
|---|---|---|---|---|
| CA | 3173071 | A1 * | 10/2021 | ........... G01S 13/887 |
| CN | 1806263 | A | 7/2006 | |

(Continued)

OTHER PUBLICATIONS

International Search Report, issued in PCT/EP2021/076531, dated Apr. 25, 2022.

(Continued)

*Primary Examiner* — Jack W Keith
*Assistant Examiner* — Clayton Paul Ridder
(74) *Attorney, Agent, or Firm* — Birch, Stewart, Kolasch & Birch, LLP

(57) ABSTRACT

A screening device for screening a person includes a cabin including a wall at least partly enclosing an inner space, and a sensor on at least part of the surface of the wall facing the inner space, the sensor being configured to sense the person present in the inner space. The screening device includes a projector projecting an image into the inner space to be viewed by the person, and a control device connected to the sensor and the projector and configured to operate the sensor to sense the person residing in the inner space, and drive the projector to project instructions to the person, associated with the operating of the sensor. The screening system may further include a hand luggage screening apparatus.

32 Claims, 10 Drawing Sheets

(51) Int. Cl.

| | |
|---|---|
| ***A43B 3/48*** | (2022.01) |
| ***G06T 7/20*** | (2017.01) |
| ***G06V 40/20*** | (2022.01) |

(58) Field of Classification Search

CPC .. A43B 3/48; G06T 7/20; G06T 11/60; G06V 40/20; G06V 5/22; G06V 8/005; G06V 11/00; G06V 20/52; G06V 3/12; G06V 3/14; G06V 8/10; G06V 10/778; G21F 1/085

See application file for complete search history.

(56) References Cited

U.S. PATENT DOCUMENTS

| | | | | |
|---|---|---|---|---|
| 11,244,527 | B2 * | 2/2022 | Hastings | G06Q 50/265 |
| 2003/0208966 | A1 | 11/2003 | Puskaric et al. | |
| 2004/0090359 | A1 | 5/2004 | McMakin et al. | |
| 2005/0024199 | A1 | 2/2005 | Huey et al. | |
| 2007/0133743 | A1 | 6/2007 | Johnson et al. | |
| 2009/0041186 | A1 | 2/2009 | Gray | |
| 2011/0102597 | A1 * | 5/2011 | Daly | G01S 13/887 348/E5.085 |
| 2012/0105267 | A1 | 5/2012 | DeLia et al. | |
| 2015/0253422 | A1 | 9/2015 | Morton et al. | |
| 2016/0078791 | A1 * | 3/2016 | Helms | G09F 27/005 348/789 |
| 2016/0116581 | A1 * | 4/2016 | Mohamadi | H01Q 21/0075 342/21 |
| 2016/0216371 | A1 | 7/2016 | Ahmed et al. | |
| 2017/0323458 | A1 | 11/2017 | Lablans | |
| 2019/0056644 | A1 | 2/2019 | Kong | |
| 2019/0120996 | A1 | 4/2019 | Columbri | |
| 2019/0196002 | A1 | 6/2019 | Manneschi | |
| 2020/0103546 | A1 | 4/2020 | Monnier et al. | |
| 2021/0018595 | A1 * | 1/2021 | McFadden | G01S 13/887 |

FOREIGN PATENT DOCUMENTS

| | | | | |
|---|---|---|---|---|
| CN | 102393537 | A | 3/2012 | |
| EP | 1 574 879 | A1 | 9/2005 | |
| EP | 2 133 709 | A1 | 12/2009 | |
| JP | 2000-235007 | A | 8/2000 | |
| JP | 2004-251624 | A | 9/2004 | |
| JP | 2004-361365 | A | 12/2004 | |
| JP | 2007-517275 | A | 6/2007 | |
| JP | 2017-514109 | A | 6/2017 | |
| JP | 2018-165634 | A | 10/2018 | |
| JP | 2019-74525 | A | 5/2019 | |
| JP | 2019-514023 | A | 5/2019 | |
| KR | 10-2013-0023930 | A | 3/2013 | |
| TW | 201909058 | A | 3/2019 | |
| WO | WO 99/21148 | A1 | 4/1999 | |
| WO | WO 2015/077167 | A1 | 5/2015 | |
| WO | WO 2019/022102 | A1 | 1/2019 | |
| WO | WO-2020016540 | A1 * | 1/2020 | G01N 23/10 |
| WO | WO 2020/157147 | A1 | 8/2020 | |

OTHER PUBLICATIONS

Written Opinion of the International Searching Authority, issued in PCT/EP2021/076531, dated Apr. 25, 2022.

* cited by examiner

SCREENING DEVICE AND METHOD FOR SCREENING A PERSON

BACKGROUND OF THE INVENTION

1. Field of the Invention

The present invention relates to a screening device and screening method for screening a person.

2. Description of Background Art

Screening persons may be performed for security reasons. The screening of the persons may for example check if a person carries with him or her any items that may evoke danger, such as a knife, scissor or other metal object, an arm such as a fire arm, an explosive, etc.

Screening persons may be performed at a variety of locations, for example at an entrance of a building, theatre, at a railway station, an airport, etc.

The screening may involve plural persons that are to be screened. Delays and waiting ques may be avoided on the one hand, while available resources (screening security personnel, screening apparatuses, square meters of building floor space, etc.) may be required to be minimized on the other hand. Moreover, a risk of erroneous screening outcomes is to be minimized.

When screening a person, traditionally, use has been made of metal detection portals. More recent developments employ radio wave scanners, such as millimetre wave scanners or terahertz scanners to scan the person for objects that may be associated with a security risk.

With these types of scanners, the person is required to enter a cabin that is at least partly surrounded by a wall. The cabin may e.g. be closed by a door or slide so as to prevent the passenger from walking through before being cleared. In case the scanning process identifies a risk, e.g. an item carried by the person, or a malfunction of part of the scan, an alarm is generated that needs to be resolved and delays may occur.

SUMMARY OF THE INVENTION

The invention aims to avoid or reduce delays in the screening of the person.

According to an aspect of the invention, there is provided a screening device for screening a person, the screening device comprising:

- a cabin comprising a wall at least partly enclosing an inner space,
- a sensor on at least part of the surface of the wall facing the inner space, the sensor being configured to sense the person present in the inner space,
- a projector projecting an image into the inner space to be viewed by the person, and
- a control device connected to the sensor and the projector and configured to:
- operate the sensor to sense the person residing in the inner space;
- drive the protector to project instructions to the person, associated with the operating of the sensor.

The wall enclosing the inner space may form a cabin in which the person is to be screened. The cabin may be provided with one or two openings for the person to enter and/or exit the cabin, e.g. an entry opening at an entry side and an exit opening at an exit side, the openings may be closable by a respective door, slide, etc. The sensor on at least part of a surface of the wall facing the inner space may be any type of sensor, e.g. a radio wave scanner such as a millimetre wave scanner, a terahertz scanner, etc. The sensor may be stationary in respect of the wall or may be movable on the surface of the wall, e.g. rotatable around the person to scan the person from circumferential angles.

The projector may project an image into the inner space, the projector may for example be arranged in or at a ceiling of the cabin, e.g. above the space in the cabin where the person is to present him or herself for screening, and may be any type of projector. For example, the projector may project an image onto the wall of the cabin. As another example, the projector may, e.g. in a holographical way, project an image into the space. For example, the projector may comprise a 3D laser projector or other 3D projector to project the image into the space. The control device may comprise any suitable controller, such as a microcontroller, microprocessor, PLC (programmable logic controller), etc., provided with suitable program instructions to perform the described steps.

The control device drives the sensor to sense the person residing in the inner space. The sensor data provided by the sensor may be processed locally or may be sent to an (e.g. local or remote) sensor data processing device. For example, sensor data formed by radio wave signals may be processed and an image derived therefrom. The image may for example be sent to an evaluation data processing device, which may evaluate the image to identify any risks, such as items (knifes, arms, etc.) carried by the person. The evaluation data processing device may be e.g. be self learning, e.g. comprise a neural network or other intelligent program architecture that establishes if any items may be identified in the image that may invoke a risk. The self learning evaluation data processing device may for example be learned from training data comprising images in which potentially risk full items have been identified by a human operator. The sensor data processing device, evaluation data processing device may be comprised in the control device or may form separate, e.g. remote devices.

In order to provide that the person adheres to the screening, the control device drives the protector to project instructions to the person, associated with the operating of the sensor. Thereby, the person is provided with instructions what to do, so as to provide that the person adheres to the screening process. For example, the person may be requested to empty his or her pockets, to put items, such as hand luggage, keys, wallet, coat, vest, etc. in a tray. As another example, the person may be requested to stand in a predetermined location in the cabin and/or to adhere to a predetermined position, e.g. to stretch his or her arms upwards. As another example, the person may be informed that the scanning has been completed and may be instructed to leave the cabin.

As a result, delays, such as may be evoked in prior art solutions, may be prevented. In prior art solutions, an operator may present himself at the cabin, the person may be prompted by the operator to step out of the cabin or provide instructions to the person how to proceed. This may result in delay, as the person may first be requested to step out of the cabin, be provided with instructions, or be requested to e.g. remove items from their pockets, etc. and then be instructed to re-enter the cabin for a repeated screening. Compared to the traditional detection portals, this delay may even be larger: for security reasons, it may be avoided that an operator enters the confined space of the cabin where a person to be screened resides, thus requiring the person (which may be mentally focused on following up written instructions in the cabin, may be stressed, etc.) to pay attention to an operator outside of the cabin, may require to open the door or slide enclosing the cabin, and may require instructing the person to step out of the cabin, etc.

Moreover, as the image is projected into the cabin, i.e. into the inner space of the cabin, placing a display panel in the cabin may be omitted. As a result, interference by such as display panel with the sensor may be avoided. Various causes of interference may be avoided. On the one hand, the display panel itself, forming a physical structure, may obstruct radio waves emitted by the sensor thus obstructing a scanning of the person. On the other hand, the display panel, such as an LCD panel or LED panel, may itself emit radiofrequency signals, e.g. resulting from driving signals in the panel associated with the driving of pixels of the display. Such digital data processing and data communication in the display panel may result in an emission of radio frequency signals that could interfere with the sensing of the person, in particular in case radio waves are employed for sensing the person.

In an embodiment, the control device is further configured to derive a location of an object on the person from the sensor data, and control the projector to display the location of the object on the person.

The control device may, when detecting an object in the scan and associated processing, derive a location of the object. The control device may then drive the projector to display the location of the object. The person may then be instructed to remove the object, e.g. put the object in a bin or tray, thereby displaying the location of the object to the person, so as to clarify to the person what the person is expected to do. The object may be any security relevant object, such as a metal object, a weapon, an explosive, a liquid, etc. Furthermore, the object may be any object that the person could have forgotten to remove, such as a wallet, key, smartphone, etc., and which object may e.g. interfere with the scanning. As the location of the object is indicated to the person, the person may be able to remove the object as instructed, without any further live operator intervention.

To visually instruct the person where an object has been localized, an artificial reality mirror image may be generated which displays a mirror image of the person including the object. Thereto, the sensor further comprises a camera directed to a desired position of the person in the inner space, the camera being connected to the control device to transmit camera image data to the control device, and wherein the control device is configured to generate a mirror image of the person from the camera image data, to create a fused image of the person by fusing the object at the derived location into the mirror image of the person and to control the projector to display the fused image of the person. Hence, a mirror image of the person may be presented to the person, in which the object location has been fused. The object may e.g. be indicated by a pictogram displaying a type of object as detected, e.g. a pictogram of a key, wallet, phone, etc., or may be indicated by a shape corresponding to a shape of the object as sensed by the sensor.

In an embodiment, the screening device further comprises the camera configured to generate image data, a gesture sensor sensing a gesture of the person and configured to generate gesture data and a motion sensor recording a movement of the person and configured to generate motion data, wherein the control device is configured to perform a risk assessment from a combination of the sensor data, the camera image data, the gesture data and the motion data and to generate a warning message based on the risk assessment As a result, a behaviour of the person, e.g. deviations of common behaviour, may be detected and assessed automatically.

The control device may be configured to perform the risk assessment using a self-learning system, the self learning system having been trained using a training dataset additionally comprising operator assessment responsive to the sensor data, camera image data, gesture data and motion data. Thereby, an experienced operator may train the self learning system.

In an embodiment, the screening device further comprises a footwear sensor on at least part of the surface of a floor of the cabin, the footwear sensor being configured to sense the person's footwear present in the inner space. The footwear sensor may be configured to sense a position of the footwear, a presence of metal, liquid, or any potentially risk invoking item or substance. The control device may further be configured to operate the footwear sensor to sense the footwear of the person, and to drive the projector to project instructions to the person, associated with the operating of the footwear sensor. The footwear sensor may for example be formed by a micrometer of millimeter wave scanner provided with an antenna in or on a floor of the inner space. The footwear sensor may e.g. employ quadrupole resonance. Quadrupole resonance, also identified as Nuclear Quadrupole Resonance spectroscopy or NQR may be understood as a chemical analysis technique related to nuclear magnetic resonance (NMR). Unlike NMR, NQR transitions of nuclei can be detected in the absence of a magnetic field, and for this reason NQR spectroscopy is referred to as "zero Field NMR". The NQR resonance is mediated by the interaction of the electric field gradient (EFG) with the quadrupole moment of the nuclear charge distribution. Unlike NMR, NQR is applicable only to solids and not liquids, because in liquids the quadrupole moment averages out. Because the EFG at the location of a nucleus in a given substance is determined primarily by the valence electrons involved in the particular bond with other nearby nuclei, the NQR frequency at which transitions occur is unique for a given substance. A particular NQR frequency in a compound or crystal is proportional to the product of the nuclear quadrupole moment, a property of the nucleus, and the EFG in the neighborhood of the nucleus. It is this product which is termed the nuclear quadrupole coupling constant for a given isotope in a material and can be found in tables of known NQR transitions. In NMR, an analogous but not identical phenomenon is the coupling constant, which is also the result of an internuclear interaction between nuclei in the analyte.

The footwear sensor may enable to screen the person while the person keeps his or her footwear (e.g. shoes, sandals) on. Measurement data obtained by the footwear sensor may e.g. be processed either by the footwear sensor itself (e.g. by a processor or image processor thereof), or by the control device. In case the scan of the footwear by the footwear sensor and associated processing of the measurement data results in a detection of an object that may be associated with a risk, the control device may drive the projector to project instructions to the person, e.g. to remove his/her shoes and present the shoes for scanning, e.g. by a hand luggage scanning apparatus of the screening device. As a result, in case the measurement by the footwear sensor and associated processing of measurement data indicates a potential risk, the person may be instructed to remove the footwear. In case the screening device is equipped with a hand luggage scanning apparatus, the person may be instructed to present the footwear to the hand luggage scanning apparatus, e.g. at a hand luggage feeding tray thereof. Accordingly, the screening process may proceed to a following step, namely the screening of the footwear by e.g. the hand luggage scanning apparatus, without the need for an immediate intervention or action by an operator.

In order to provide operator assistance to the person, in an embodiment, the control device is configured to establish a connection to an operator console, output an instruction to an operator at the operator console to communicate to the person, and control the projector to display an image of the operator (e.g. a video image of the operator) at the operator console.

As the operator assistance is provided via the display, the person in the cabin can be provided with (e.g. audio visual) instructions by the operator. The person may communicate with the operator using a camera and microphone comprised in the security device, i.e. in the cabin, therefore being able to communicate with the operator without requiring the person to leave the cabin. On the one hand, the assistance may be available faster, as the operator does not need to walk to the cabin, and on the other hand, the operator may, from the operator console, provide assistance and/r supervise plural security devices, thus potentially enhancing efficiency.

In an embodiment, the control device is configured to derive from the sensor data a location of an object on the person, transmit the location of the object on the person to the operator console, and transmit instructions to the operator console requesting the operator to explain to the person the location of the object.

The operator may hence be assisted to remotely asses a cause of non-compliance, e.g. an object carried by the person. The location of the object is sent to the operator console and displayed at the operator console. The operator can then explain to the person where an object has been found in the scan, and what the person has to do. To assist the remote operator, the control device may transmit to the operator console a video stream showing the entire process from entering the cabin up to the event that triggered the call for the remote operator to assist the person In order to provide that operator assistance may requested in various circumstances, in an embodiment, the control device is configured to output the instruction to the operator in case a criterion is fulfilled, the criterion comprising at least one of:

the person initiating an operator contact request (e.g. the person not knowing what to do, getting confused, facing an error message, panicking, etc.)

the control device establishing that a pre-set screening time has elapsed (e.g. several attempts have been carried out unsuccessfully), the control device establishing that a presence of an object has been established.

In an embodiment, the sensor comprises a radio wave scanner comprising a radio wave antenna array, the radio wave antenna array covering at least part of the surface of the wall behind the projected image. As the projected image may not obstruct the radio wave transmission from the antenna array, blocking or attenuating the radio waves from the antennas behind the projected image may be avoided, thereby enabling to scan the person making use of all antennas and potentially avoiding blind spots in the scan of the person, as "shadow" effects by a display panel interposed between one or more of the antennas and the person, may be avoided.

In an embodiment, the projector is configured to project a two dimensional image on the wall of the cabin or a three dimensional image in the inner space.

In an embodiment, the screening device further comprises an object depositing tray and wherein the instructions comprise instructions to deposit the object in the object depositing tray.

The tray may be stationary, to allow the person to reclaim the deposited object after the scanning, or may be conveyed by a conveyor, for example to a hand luggage screening system, as described in more detail below. In case hand luggage inspection techniques are used that require shielding from the person, such as X-ray inspection, the hand luggage may be conveyed away from the interior of the cabin. Otherwise infrared, video, etc. inspection techniques may be applied onto the hand luggage.

In an embodiment, the screening device further comprises a hand luggage screening apparatus, and a conveyor to convey the hand luggage from the cabin to the hand luggage screening apparatus, the control device being configured to drive the conveyor to convey the hand luggage deposited in the object depositing tray to the hand luggage screening apparatus, to drive the hand luggage screening apparatus to screen the hand luggage, and drive the conveyor to convey the hand luggage back into the cabin.

In an embodiment, the screening device further comprises an identification device, the control device being configured to identify the person using identification data from the identification device, and associate the depositing tray to the identified person. Hence, in case the tray holding the object is conveyed away by the conveyor, the association of the tray to the person may enable to convey the tray to a reclaiming station where the corresponding person has identified himself/herself. The identification device may comprise a camera, a passport scanner, a boarding pass scanner, etc. The identification may be performed using e.g. biometric data, such as an image of a face or iris of the person In an embodiment, the control device is configured to drive the display device to provide instructions to the person to adhere to a predetermined screening sequence. Thereby, an efficient screening may be performed, even with persons that are not familiar with the procedure yet. The screening process may for example comprise the steps of the person identifying himself or herself at an identification station, the person removing a coat or jacket, the person placing coat, jacket in a tray, the person emptying his/her pockets and depositing the items in the tray, the person taking a predetermined position (e.g. marked on the floor or displayed by the projector), the person reaching with his/her arms upward, the person being scanned by the sensor, the person being informed (e.g. by a message displayed by the projector) that the scan has succeeded, the person being prompted to leave the cabin, etc.

The sensor may further comprises a camera, the control device is configured to process an image form the camera to derive a progress of the screening of the person therefrom, to compare the derived progress of the screening to the predetermined screening sequence, and to derive the instructions provided to the person from the comparison of the derived progress to the predetermined screening sequence. Image processing and a self-learning system may be employed to assess progress. The self-learning system may initially be trained using images (such as video or still images) and associated operator input.

In an embodiment, the screening device further comprises:

a hand luggage screening apparatus configured to scan the hand luggage deposited by the person, wherein the hand luggage screening apparatus comprises a primary scanner and an X-ray diffraction scanner, and wherein the control device is configured to operate the hand luggage screening apparatus to scan the hand luggage by the primary scanner to generate primary scanner output data associated with the scan of the hand luggage, determine an area of interest of the hand luggage from the primary scanner output data, operate the X-ray diffraction scanner to scan the area of interest of the hand luggage to generate X-ray diffraction output data associated with the scan of the hand luggage by the X-ray diffraction scanner, process the primary scanner output data and the X-ray diffraction output data to determine if an alarm signal is to be generated, and output the alarm signal if generated.

The primary scanner may e.g. comprise an X-ray scanner, e.g. a CT (Computer Tomography) scanner. The primary scanner may e.g. identify potentially relevant objects, such as liquids, that may require further inspection. In case a potentially relevant object is identified in the output data (image data) of the primary scanner, an area of interest may be marked in an image of the hand luggage, the area of interest covering or coinciding with the potentially relevant object. The area of interest may hence relate to a part of the hand luggage or to the hand luggage itself. Accordingly, the X-ray diffraction scanner may be operated to scan the area of interest. Using X-ray diffraction scanning, a material of the potentially relevant object may be determined based on the diffraction pattern of X-rays radiated onto the area of interest. In case of potentially hazardous materials, the control device may generate and output an alarm signal, e.g. to an operator console to enable an operator to take appropriate actions.

In an embodiment, the screening device further comprising:

a first identification station configured to request a person to present a token, a hand luggage depositing station configured to collect hand luggage deposited by the person, the first identification station being associated with the hand luggage depositing station, a hand luggage screening system configured to screen the hand luggage, a hand luggage reclaiming station, downstream of the hand luggage screening system, configured to reclaim the hand luggage deposited by the person, a second identification station being associated with the hand luggage reclaiming station, the screening device forming a passage for the person from the hand luggage depositing station to the hand luggage reclaiming station, and a hand luggage conveying system configured to convey the hand luggage from the hand luggage depositing station via the hand luggage screening apparatus to the hand luggage reclaiming station, the control device further being configured to:

read the token presented by the person at the first identification station;

associate the presented token to the hand luggage deposited by the person at the hand luggage depositing station;

upon the person having been screened by the screening device, read the token presented by the person at the second identification station at the reclaiming station, control the hand luggage conveying system to convey the hand luggage associated with the token to the hand luggage reclaiming station.

The first identification station may request any suitable token, such as a passport, driving license or other identification document, a boarding pass, airline ticket, etc. In an embodiment, the token comprises biometric data, such as facial recognition or iris scan.

The hand luggage depositing station collects hand luggage deposited by the person, the first identification station being associated with the hand luggage depositing station so as to associate the hand luggage as deposited to the person. The hand luggage may for example be deposited in a tray provided with an identification, such as an RF identification or radio frequency identification, to associate the tray carrying the hand luggage to the person.

The hand luggage may then be conveyed to the hand luggage screening system to screen the hand luggage, The person then proceeds to the screening device as disclosed in the present document.

A hand luggage reclaiming station is provided downstream of the hand luggage screening system, to enable the person reclaim the hand luggage deposited by the person.

In order to identify which hand luggage, i.e. which tray to return to the person, a second identification station is provided and being associated with the hand luggage reclaiming station.

As the screening device forms a passage for the person from the hand luggage depositing station to the hand luggage reclaiming station, the person can only reach the reclaiming station once having been screened by the screening device.

The hand luggage conveying system conveys the hand luggage from the hand luggage depositing station via the hand luggage screening apparatus to the hand luggage reclaiming station, and after the person having been screened by the screening device, the person may identify as the second identification station causing the hand luggage conveying system to convey the hand luggage associated with the token to the hand luggage reclaiming station for reclaiming by the person.

The first and second identification devices, the hand luggage depositing station, hand luggage screening system, hand luggage conveying system and the hand luggage reclaiming station may be arranged outside of the cabin of the screening device.

In an embodiment, the screening device comprises plural hand luggage reclaiming stations, and wherein the control device is configured to designate one of the plural hand luggage reclaiming stations to the token, to control the hand luggage conveying system to convey the hand luggage associated with the token to the designated one of the plural hand luggage reclaiming stations and to output instructions to the person having passed the screening device and presenting the token to collect the hand luggage associated with the token at the designated one of the plural hand luggage reclaiming stations.

The screening device may further comprise plural hand luggage depositing stations and associated first identification stations, to further increase a throughput. The person may hence be directed to an available, free depositing station and associated first identification station, then proceed to be screened by the screening device, following which the person may recollect the hand luggage at one of the reclaiming stations. In an embodiment, the person proceeds to a free reclaiming station on his/her own initiative, and identifies, following which the corresponding hand luggage is conveyed to the reclaiming station. Alternatively, the person may be instructed, e.g. on a display, to which one of the reclaiming stations to proceed. When using plural reclaiming stations and optionally plural depositing stations, the cabin of the person screening device(s) and the hand luggage screening apparatus(es) may be used at an optimum efficiency, there enabling to reach a maximum flow of persons and hand luggage per cabin of the screening device respectively per hand luggage screening apparatus.

In an embodiment, the screening device further comprises the object depositing tray and wherein the control device is configured to control the hand luggage conveying system to convey the object deposited in the object depositing tray to the designated one of the plural hand luggage reclaiming stations. Accordingly, the screening device may further comprise an identification device to scan the token. The depositing tray may then be associated to the identified person. Hence, in case the tray holding the object is conveyed away by the conveyor, the association of the tray to the person may enable to convey the tray to a reclaiming station where the corresponding person has identified himself/herself.

According to another aspect of the invention, there is provided a screening device comprising a hand luggage depositing station, a hand luggage reclaiming station, a first hand luggage screening apparatus, a second hand luggage screening apparatus and the hand luggage conveying system to convey the hand luggage from the hand luggage depositing station to either one of the first and the second hand luggage screening apparatuses and from to either one of the first and the second hand luggage screening apparatuses to the hand luggage reclaiming station, wherein the conveying system comprises a shielded hand luggage conveying path extending between the first and second hand luggage screening apparatuses, wherein the hand luggage depositing station loads into the shielded hand luggage conveying path via a loading port having a conveying direction perpendicular to a loading conveying direction between the first and second hand luggage screening apparatuses, wherein the shielded hand luggage conveying path discharges to the hand luggage reclaiming station via a discharging port having a discharging conveying direction perpendicular to a conveying direction between the first and second hand luggage screening apparatuses and wherein radiation shields configured to shield radiation generated by the first and second hand luggage screening apparatuses are arranged at the loading port and at the discharging port.

The hand luggage screening apparatuses may inspect the luggage using X-ray radiation. For safety, the X-ray radiation is to be shielded from persons. Shielding flaps are used both at an entry and an exit of the hand luggage screening apparatus. In order to provide shielding, even when a following tray is conveyed into the hand luggage screening apparatus, resp. a previous tray Is conveyed out of the hand luggage screening apparatus, plural shielding flaps are used, e.g. 3 flaps at each opening. As the trays that carry the hand luggage are to pass the shielding flaps, items of hand luggage may be swiped out of the tray by the flaps. Furthermore, the flaps may cause a tray to be held back, e.g. in case the tray is loaded with low weight hand luggage or in case a voluminous item in the tray is held back by the flaps.

The shielded conveying path between the hand luggage screening apparatuses may enable to omit the shielding flaps at the hand luggage screening apparatuses, hence may thereby mitigate the problems associated with the prior art flaps. In order to prevent any remaining leakage of radiation at the loading port or discharging port, radiation shields, such as lead curtains, may be provided at the ports.

The screening device according to the present aspect may be comprised in the screening device as described above, however may also be provided as such.

The radiation shields may be lead curtains and shielding flaps at the first and second hand luggage screening apparatuses may be omitted.

To provide further shielding at the loading and discharging ports, the loading port comprises a loading port shield extending along the loading direction and wherein the discharging port comprise a discharging port shield extending along the discharging direction.

To provide load balancing of the screening devices, i.e. to distribute the trays in a balanced way over the first and second screening apparatuses, the first and second hand luggage screening apparatuses may be bi-directional and the shielded hand luggage conveying path may bi-directional, so that the hand luggage may be offered to either one of the screening devices.

According to a further aspect of the invention, there is provided a method of operating a screening system comprising the screening device according to the invention,

- wherein the screening device is further configured to operate at at least two different detection rates,
- the method comprising:
  - defining a screening system detection rate, the screening system detection rate defining a required detection rate of the screening system;
  - selecting one of the detection rates of the screening device to comply with the screening system detection rate; and
  - sending instructions to the control device of the screening device to operate at the selected detection rate so as to comply with the screening system detection rate.

The screening system detection rate defines a rate at which security risks are to be detected.

The rate may for example be defined as an overall detection rate for a predefined (test) population of persons equipped with predefined hazardous material. Alternatively, the rate may be defined as a rate per type of hazard, e.g. a rate for explosives, a rate for weapons, etc.

The screening system may comprise the screening devices supplemented by other screening equipment and/or procedures. For example, the screening system may further comprise other detection devices, such as camera's, radar, etc. and/or a risk profiling computer device to assign a risk profile per person. The risk profiling computer device may e.g. make use of artificial intelligence and be provided with a variety of data relating to a person, e.g. an age, an occupation, camera image data, past safety screening results of the same person, etc.

The screening device may be set to different detection rates. A higher detection rate may on the one hand provide a higher rate of detecting hazards. On the other hand, the higher detection rate may provide a higher rate of false alarms or result in additional screenings, e.g. by safety personnel, which reduce a through put of the screening device, e.g. in number of persons per time unit. In view of efficiency and cost, it is intended to balance detection rate and efficiency, in order to meet a required overall detection rate of the system, while keeping efficiency at a highest possible level.

Accordingly, the screening device may be set to different detection rates. Thereto, the control device may adapt e.g. a detection threshold setting an alarm threshold, or may adapt a threshold that defines when a secondary screening is to be performed, or a threshold that defines what object size/type is to be removed from a pocket of a person, etc. Such threshold may relate to a detection rate, in that the threshold may determine in what circumstances to proceed to a further check, alarm, etc. The different detection rates of the screening device may accordingly be implemented by different detection thresholds, etc. One of the detection rates of the screening device may be selected. The detection rate of the screening device in combination with detection rates of further equipment and procedures in the screening system, results in an overall detection rate of the screening system in which the screening device is comprised.

The detection rate of the screening device defines a detection rate of a security hazard to be detected at the person, the hand luggage and/or the footwear of the person. For example, an alarm threshold and/or a secondary detection threshold may be amended.

It is noted that in the present document, the terms scanning, screening, sensing may refer to the same and may hence be interchangeable. Similarly, the terms person and passenger may both refer to a person and may hence be interchangeable in case the person is a passenger. Likewise, the terms object, item, etc. may refer to the same and may hence be interchangeable.

BRIEF DESCRIPTION OF THE DRAWINGS

Further features, advantages and effects of the present disclosure may become clear from the appended drawing and corresponding description, showing a non-limiting embodiment, wherein.

DETAILED DESCRIPTION OF THE INVENTION

Figure 1:
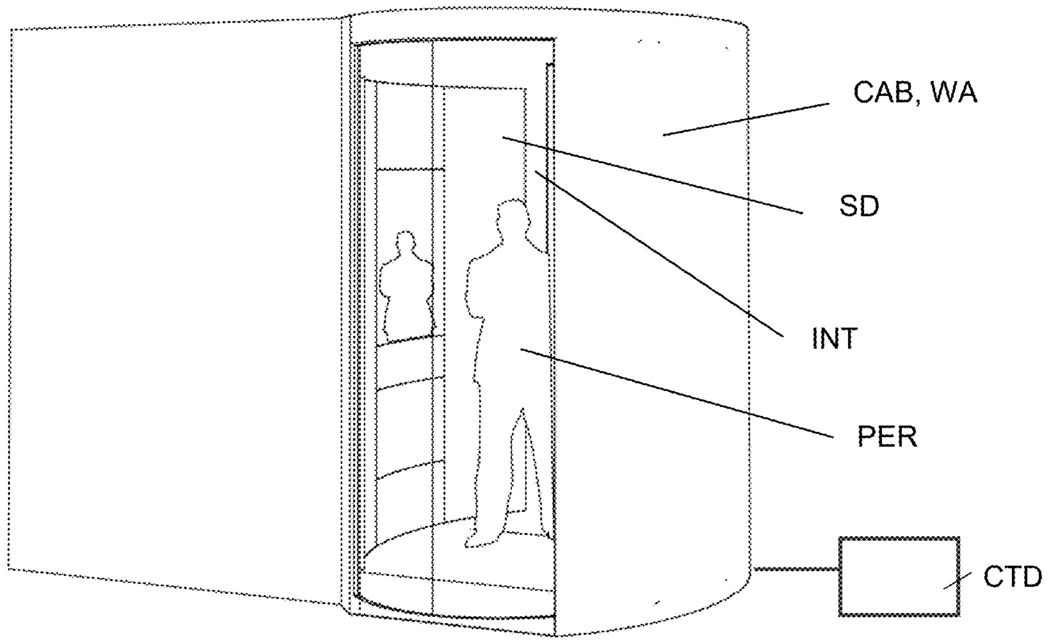
FIG. 1 depicts a perspective view of a screening device.

It is noted that throughout the figures, the same or similar reference numerals may be employed, referring to the same or similar features.

Background

Self-service has become a normal feature of more and more activities in our daily lives and nowhere is the trend toward self-service more evident than in travel. Today, travellers research and plan their own vacations, book their own flights, hotels, transport, restaurants and activities. When they arrive to an airport, they can tag their own checked luggage and print out boarding passes.

Likewise, airport security screening can be made more passenger-centric to allow travellers to manage their journey through the checkpoint. There is also a strong business case driving the use of self-service solutions and extending self-service to security screening for governmental, airport and air carrier stakeholders to drive productivity. These efficiencies in capital investment and reduced staffing requirements achieved from passenger risk segmentation and risk based dynamic screening, increase flexibility for airports' checkpoint design options, automation of detection and alarm resolution capabilities and the integration of new and advanced technology.

Hence, the present development aims at an efficient design of a self-service passenger security environment satisfy the stringent screening requirements; ensuring security outcomes, while delivering a positive, passenger centred experience for large volumes of diverse, multi-lingual and multi-cultural travellers.

FIG. 1 depicts a perspective view of the screening device SD (also denoted as Passenger Self Screening device). The screening device comprising a cabin CA enclosed by a wall WA forming an interior space INT in which a person PER has entered through a door, in the present case a sliding door SD.

Technical Concept

The proposed concept may combine intuitive man-machine interfaces, passenger data and advanced technology physical screening to create a concept that can be applicable to all passenger types and threat levels.

A process of screening will be described in the below:

1. Passenger Arrival:

Passenger arrives at the checkpoint with carry-on baggage. Interactive signage directs passenger to an available passenger self screening device SD. The passenger presents identification credentials (e.g. a token, such as a passport, boarding pass, facial image or other biometric information) to a reader (identification). The reader verifies the passenger's identity and assigns passenger risk score from Secure Flight data and other relevant sources. Once identity and flight information are authenticated, the reader/user interface indicates to passenger that they are cleared for screening and the entry door of the cabin of the passenger self screening device opens.

Passenger self screening device design and access control

Single point passenger self-service screening device,

Modular design that can be incorporated into groups of passenger self screening devices Occupies minimal space Hardware screening systems in standard component bays High throughput Passenger interface graphical user interface (GUI):

Enables accessible property and on-person self-screening in a simple, clear passenger GUI and screening workflow "Wizard".

Screen(s) displaying passenger process "Wizard" instructions for self-divesting of threat objects identified by an X-ray or On Person Screening (OPS) Automatic Target Recognition (ATR) algorithm and rescanning, minimizing ATR false alarms.

Multi-modality TSO touchscreen (or contact-less interface) workstation for process monitoring and alarm resolution.

Passenger data risk processing and future biometric interface

Figure 2:
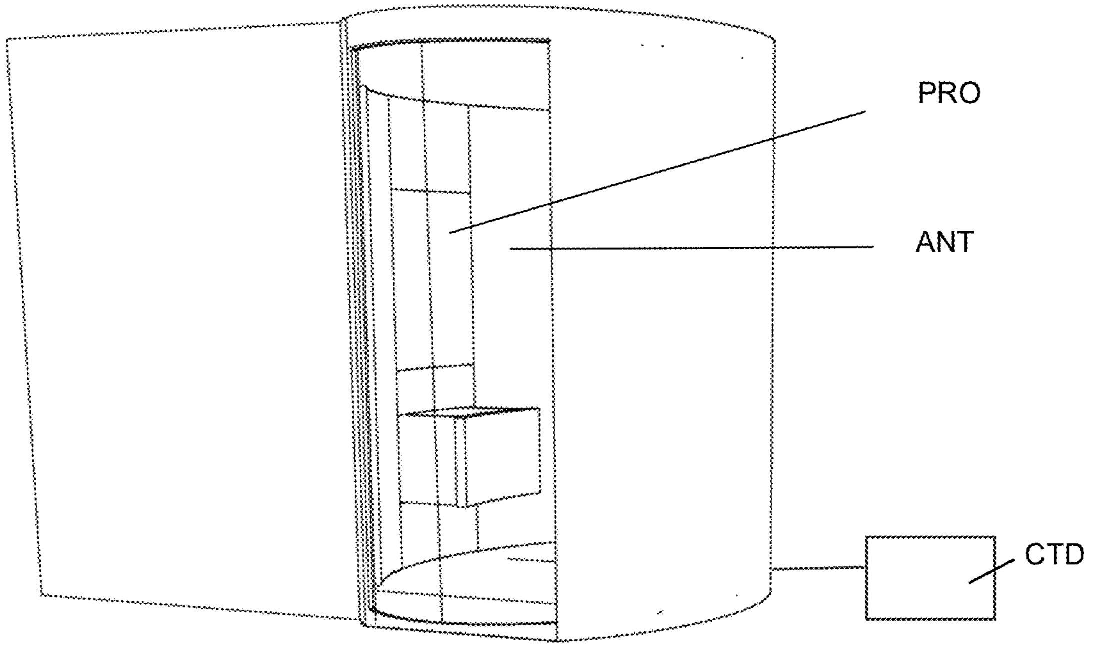
FIG. 2 depicts another view of the screening device
Figure 3:
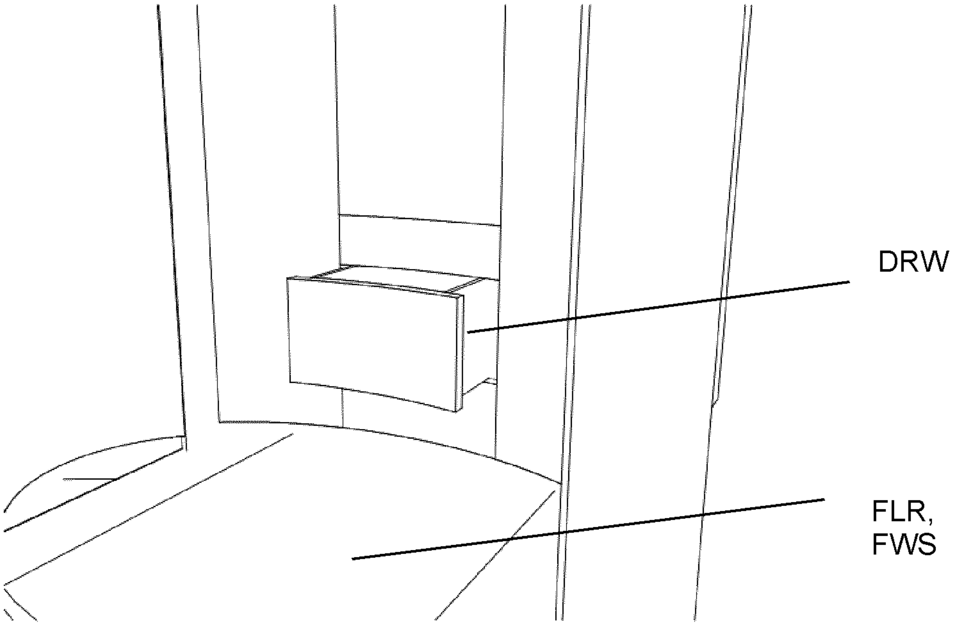
FIG. 3 depicts a detailed view of a hand luggage tray of the screening device.

- Fully enabled and integrated multi-cloud architecture featuring a robust API Gateway with established services
- Real-time KTN validation service through digital identity and identity assurance apps that are integrated with facial matching software for biometric authentication 2. Passenger Self-Screening Preparation:

The passenger moves into the cabin CAB of the passenger self-service screening device SD, which is designed to be comfortable, spacious and minimize anxiety or claustrophobia. The passenger self-screening device incorporates video (by means of a video camera) and associated analytics to monitor passenger, communicate that the passenger self-screening device is engaged and identify anomalous behaviour. An interactive screen in the self-screening device communicates screening and divestment process to passenger. Video with audio instruction and signage will provide instruction. Thereto, a projector is provided, e.g. in a ceiling of the cabin, which projects a video image PRO onto a wall of the cabin, as depicted in FIG. 2. FIG. 2 further schematically depicts antennas ANT of a millimetre wave scanning system forming part of a sensor, to scan the person.

Video System

- IP camera-based system including multiple cameras for multiple viewpoints to cover all passenger activity within the passenger self-screening device.

As depicted in FIGS. 1 and 2, a control device CTD is connected to the sensor and the projector and configured to operate the sensor to sense the person residing in the inner space; and to drive the projector to project instructions to the person, associated with the operating of the sensor.

3. Person Screening:

Upon entering the passenger self-screening device, on-person screening commences. Passenger divest requirements are initially determined by the video analytics system (e.g. coats, outerwear) and the passenger interface screen communicates divest instructions. Additional divestment instructions are communicated to direct passenger to remove and place in the property screening system along with any other items normally divested from the person (phone, keys etc.). A drawer DRW may be opened by the control device to form a hand luggage tray into which the hand luggage (incl. phone, keys, etc.) may be deposited. The passenger is then cued to adopt the scan pose by the video system. Optimal passenger foot position on the floor FRL is also communicated to ensure that footwear screening system FWS can operate effectively. The passenger self-screening device communicates to passenger indicating when divestment and scanning is complete. Then the passenger self-screening device instructs passenger to load belongings into a hand luggage drawer.

- Voxel Radar: In-Motion millimeter wave body imaging
- Screens passenger during the entire process within the passenger self screening device
- Aggregates scan data to utilize optimized illumination and avoid blind spots A concept of the interior of the passenger self screening device showing the possible location of the sensor antennas ANT is shown in FIGS. 4A and 4B.

Figure 4A:
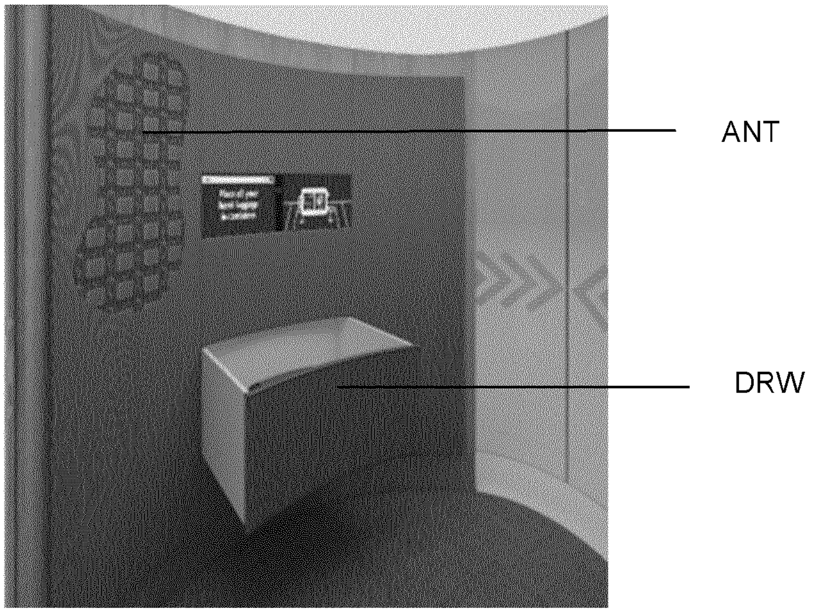
FIGS. 4A and 4B depict perspective views of an interior of the screening device.
Figure 4B:
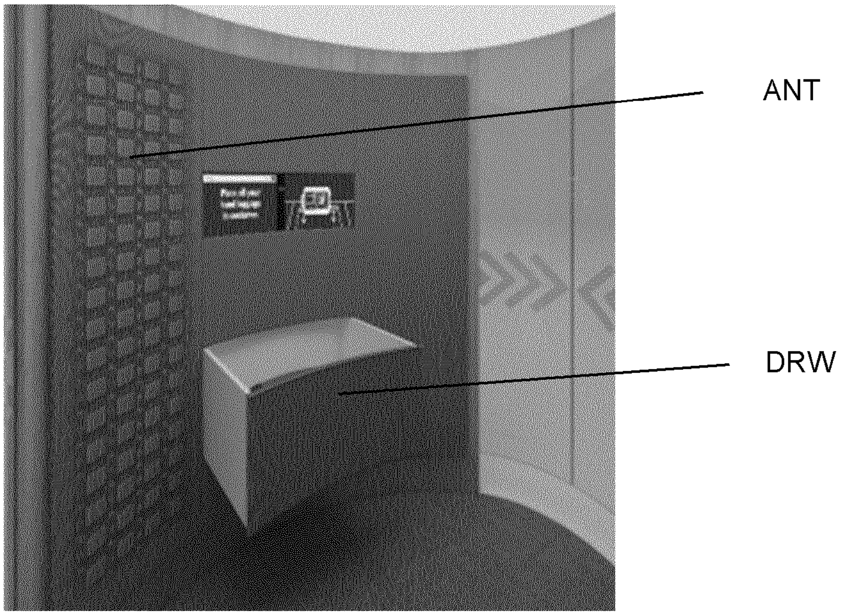

FIGS. 4A and 4B: The interior of the passenger self screening device showing the personnel screening system.

The control device may be configured to operate the footwear sensor to sense the footwear of the person, and to drive the projector to project instructions to the person, associated with the operating of the footwear sensor.

The control device may control the footwear sensor to start a scan of the footwear of the person once the person has entered the cabin (i.e. the inner space) of the passenger self screening device. For example, if a measurement by the footwear sensor, e.g. an NQR measurement, takes a longer time than a scanning of the person, e.g. by mm wave measurement, the control device may control the footwear sensor to start sensing while the passenger is still preparing for the scan, e.g. putting their belongings into the tray and/or reading instructions provided via the projector.

Figure 5A:
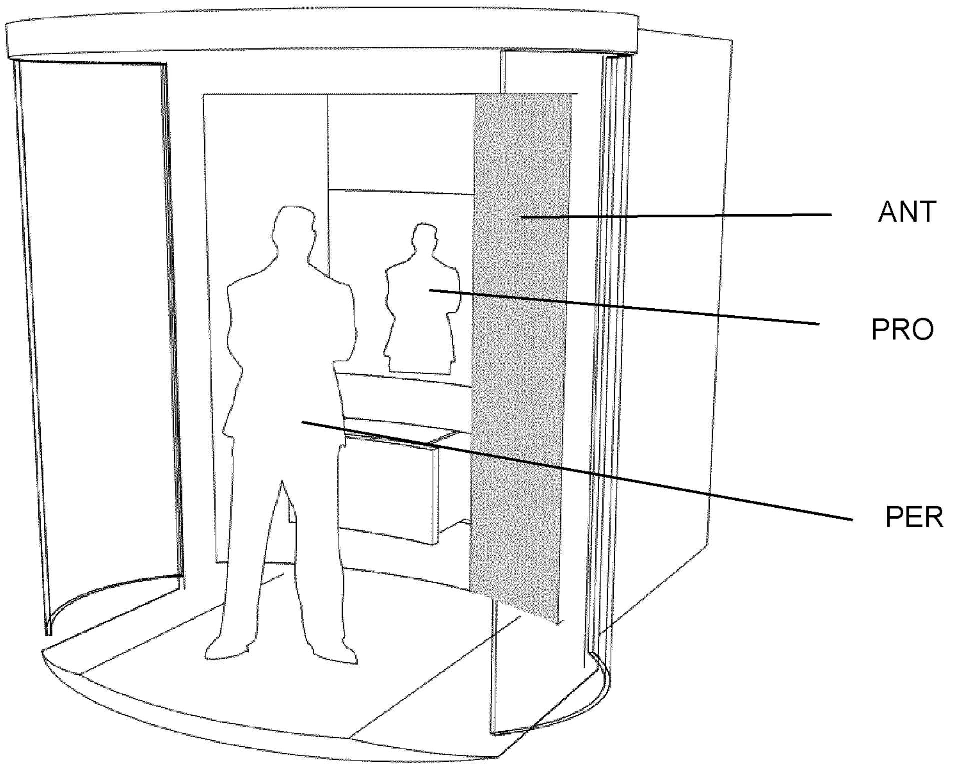
FIGS. 5A and 5B depict a perspective view of the interior of the screening device while screening a person.
Figure 5B:
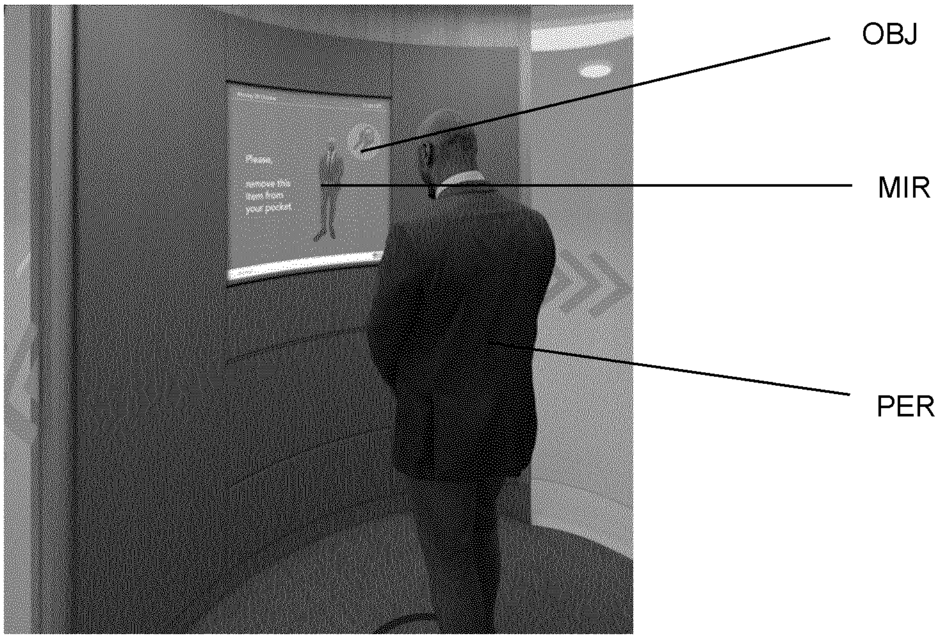

4. On-Person Alarm Resolution:

To support passenger self-resolution of on-person alarms, the system's passenger interface indicates to passenger the location of an alarm and instructs passenger PER to remove alarm item or shoes and place them into the hand luggage (property) screener. The projector projects an artificial reality mirror on the wall of the cabin. The alarm item OBJ is indicated in the displayed artificial realty mirror PRO, as depicted in FIGS. 5A and 5B. Once alarm items or shoes have been put in the property screener, another scan is initiated of both the person and belongings. If the scans are clear, on-person screening is completed. The video system monitors passenger actions to ensure compliance with divest requirements and to detect anomalous behaviour.

5. Property Screening:

Property screening procedures are directed by the passenger self screening device interface. The passenger is directed to place all accessible property into the property screener with other divest items. The passenger self screening device property screener consists of a primary screening system sensor and an automated alarm resolution capability. Both are initiated when the door of the property screener has been closed and will lock during screening. The video system monitors that all items have been placed into the property screening system. The passenger interface informs the passenger of the property scan progress and status. If the accessible property systems and automatic threat recognition (ATR) do not detect threats, prohibited items or explosives the passenger can collect belongings. The passenger self screening device interface indicates to the passenger that they are cleared to proceed to gate and passenger self screening device door opens automatically.

Static CT primary accessible property screening system.

Figure 7A:
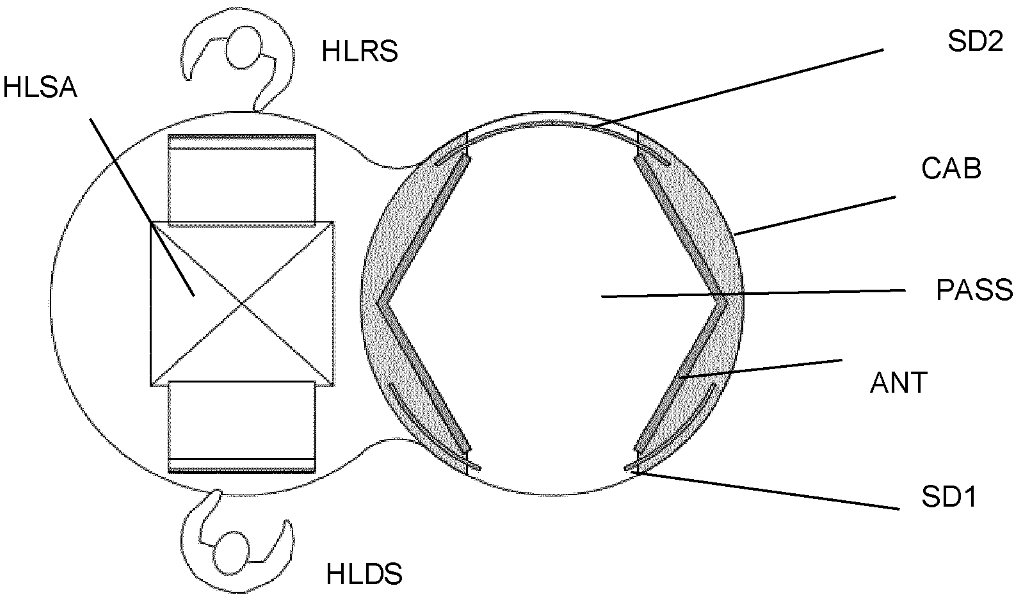
FIGS. 7A-7C depict top view of screening device.
Figure 7B:
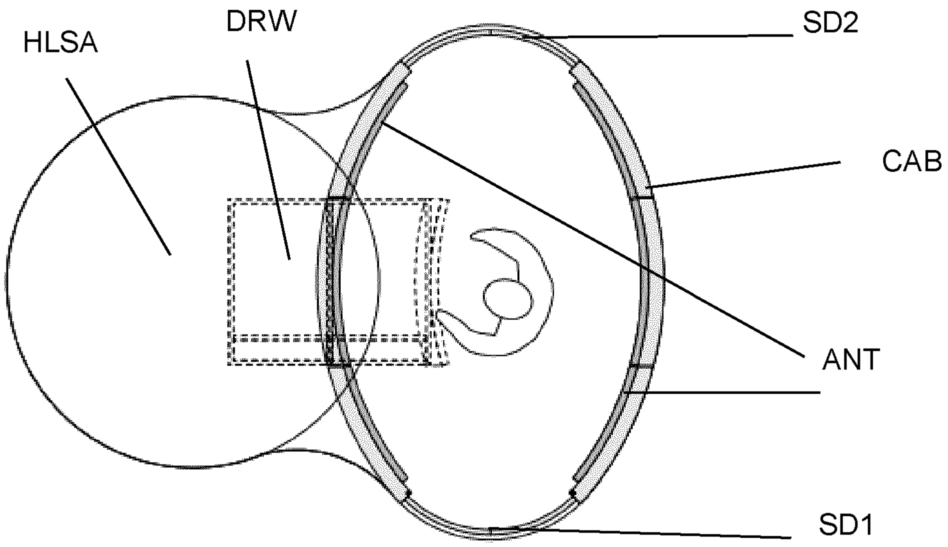
Figure 7C:
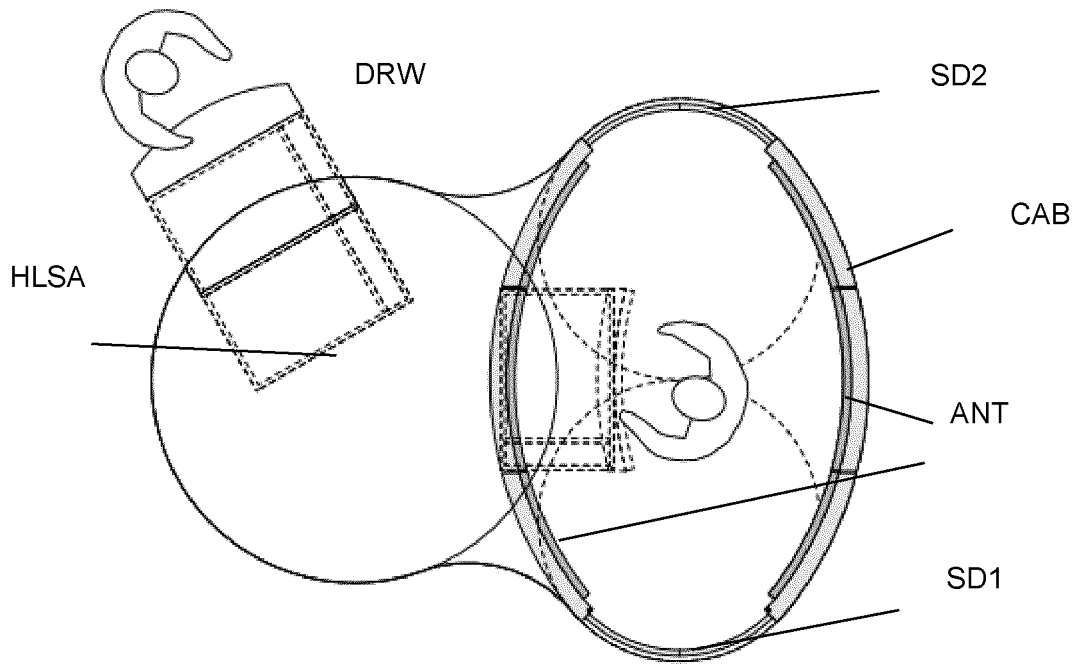

FIG. 7A-7C depicts 3 examples of possible configurations, whereby the cabin forms a passage between the entry side for to be screened passengers and exit side for screened passengers. The entry side of the cabin can be closed by sliding door SD1, the exit side by sliding door SD2. Once a passenger has identified himself and entered, the sliding door SD1 closes. The sliding door SD2 remains closed until the screening has been completed and no alarm generated. In FIG. 7A, a hand luggage depositing station HLDS is provided at the entry side, while the passenger may reclaim the hand luggage after having been screened and left the cabin at exit door SD2 to reclaim the hand luggage at hand luggage reclaiming station HLRS. A hand luggage scanning apparatus HLSA is provided between the depositing station and reclaiming station, e.g. adjacent to the cabin to scan the hand luggage while the passenger is screened in the cabin.

FIG. 7B depicts a similar arrangement, whereby the passenger takes the hand luggage into the cabin, to be deposited into the drawer DRW. The hand luggage screening apparatus HLSA is arranged adjacent to the cabin, and fed with the hand luggage from the drawer by a conveyor. Once screened the hand luggage is conveyed back to the drawer to be recollected by the passenger before exiting the cabin via the exit at sliding door SD2. FIG. 7C depicts a variant to the embodiment of FIG. 7B, whereby the passenger takes the hand luggage into the cabin, to be deposited into the drawer DRW. The hand luggage screening apparatus HLSA is arranged adjacent to the cabin, and fed with the hand luggage from the drawer by a conveyor. Once screened the hand luggage is conveyed to a reclaiming station (e.g. drawer) outside of the cabin, at the exit side, to be recollected by the passenger after exiting the cabin via the exit at sliding door SD2. Hence, once the screening has been completed, the passenger is requested to exit the cabin, thus enabling entry of a following person via the entry at SD1 to commence scanning a following passenger, while the passenger that has just left the cabin can recollect the hand luggage at ease.

6. Property Alarm Resolution:

To resolve alarms in passengers' belongings, the passenger self screening device interface identifies the item to passenger and instructs them to remove the item(s). The item is placed next to the bag in the scanner and the scan is repeated. Once bag and the item are cleared, the passenger is instructed to retrieve all items from the property screening and to proceed to gate.

If the bag and/or the item(s) cannot be cleared, the system automatically alerts an operator who is immediately dispatched to the passenger self screening device to conduct further alarm resolution procedures.

The screening device may comprise:

a hand luggage screening apparatus configured to scan the hand luggage deposited by the person, wherein the hand luggage screening apparatus comprises a primary scanner and an X-ray diffraction scanner, and wherein the control device is configured to operate the hand luggage screening apparatus to scan the hand luggage by the primary scanner to generate primary scanner output data associated with the scan of the hand luggage, determine an area of interest of the hand luggage from the primary scanner output data, operate the X-ray diffraction scanner to scan the area of interest of the hand luggage to generate X-ray diffraction output data associated with the scan of the hand luggage by the X-ray diffraction scanner, process the primary scanner output data and the X-ray diffraction output data to determine if an alarm signal is to be generated, and output the alarm signal if generated.

7. Passenger Departure:

Passenger departs for their journey; passenger self screening device is free to screen the next passenger.

Figure 8A:
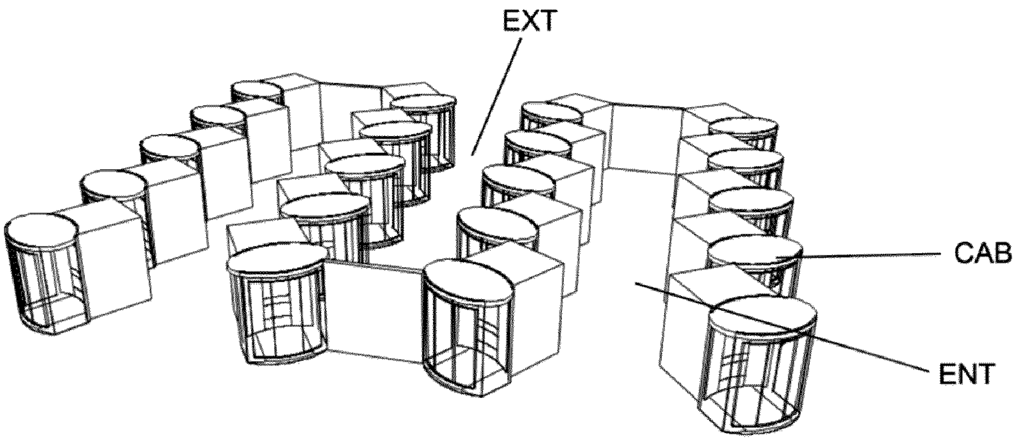
FIGS. 8A and 8B depict perspective views of an arrangement of screening devices.
Figure 8B:
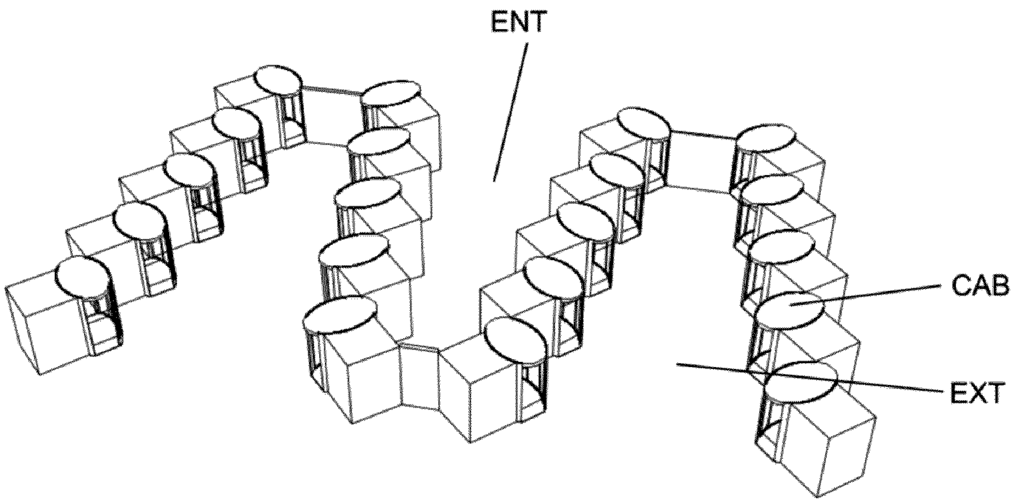

Arrangements of plural screening devices, such as depicted and described with reference to FIGS. 7A-7C, are depicted in a front view FIG. 8A and rear view FIG. 8B. The screening devices are connected against each other to form a chain whereby the exit doors of the cabins discharge into an exit side EXT while the entry doors of the cabins all connect to the entry side ENT. As depicted in FIGS. 8A and 8B, the chain of screening devices meanders, so as to reduce a total required floorspace.

Figure 6A:
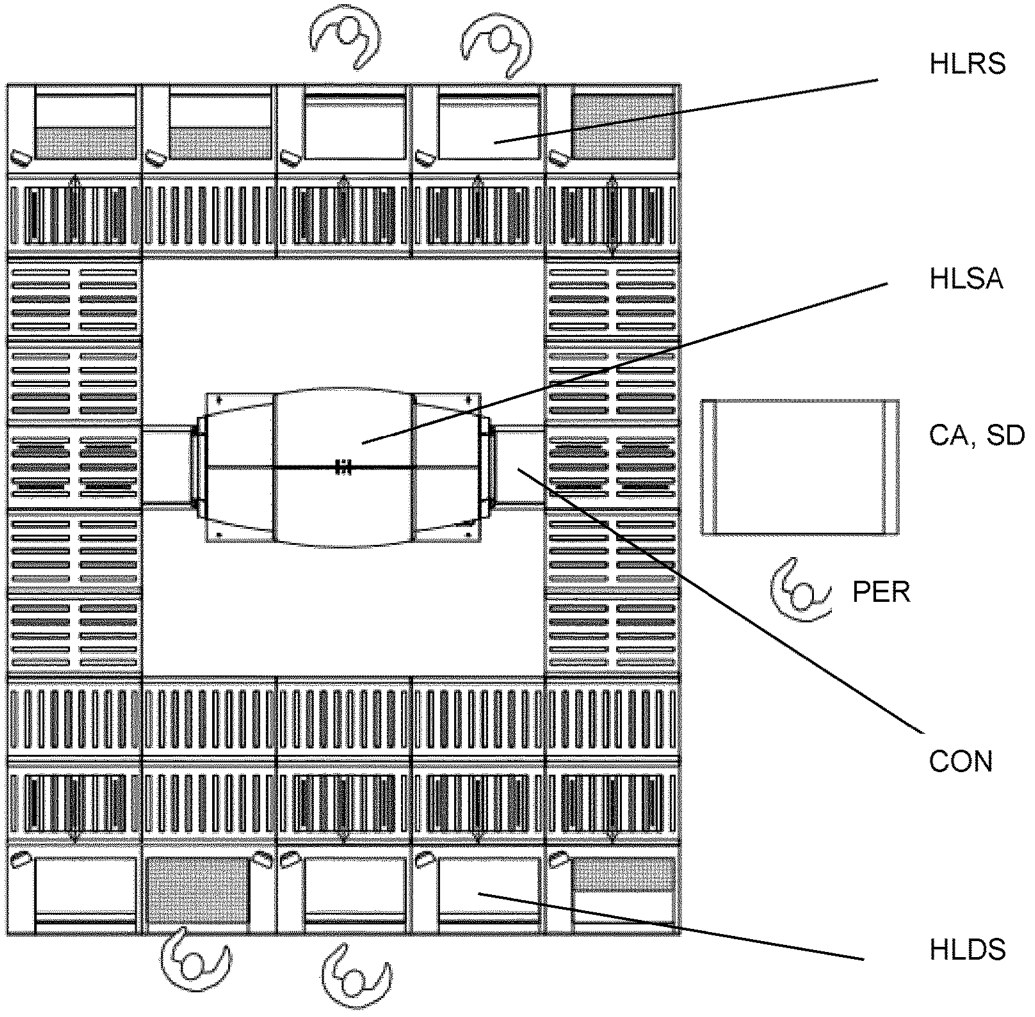
FIGS. 6A and 6B depict a highly schematic top view of a passenger and hand luggage screening system.

FIG. 6A depicts a cabin of a screening device SD and a hand luggage screening apparatus HLSA. The cabin and hand luggage screening apparatus are provided with plural hand luggage drop of stations HLDS at the entry side of the cabin and plural hand luggage reclaiming stations HLRS at the exit side of the cabin. A conveyor conveys the hand luggage from the depositing stations to the reclaiming stations. The hand luggage screening apparatus may be bi-directional, i.e. hand luggage may be fed from left to fight or vice versa (seen in the plane of the drawing). The conveyor connects both entries/exits of the hand luggage screening apparatus to the depositing stations and reclaiming stations to increase conveying capacity. Due to the bi-directional nature, in case a screening of a tray is to be repeated (e.g. on operator instructions), the bidirectional conveyor may convey the tray back into the hand luggage screening apparatus. As the hand luggage depositing and the hand luggage reclaiming may each take more time than the screening of the hand luggage respectively the screening of the person, a capacity of the hand luggage screening apparatus and a capacity of the screening cabin CA of the screening device SD may hence be used more efficiently, while enabling the persons to depositing the hand luggage and reclaim the and luggage at ease. Instead of the single screening device, i.e. cabin CA, a chain of screening devices may be employed, as depicted in and described with reference to FIGS. 8A and 8B. The passenger may thereby proceed from the hand luggage drop of stations for drop of the hand luggage, to the entry side of the chain of screening devices, and after having been screened by one of the screening devices, the passenger may proceed from the exit side of the chain of screening devices to the hand luggage reclaiming stations for reclaiming the hand luggage.

Figure 6B:
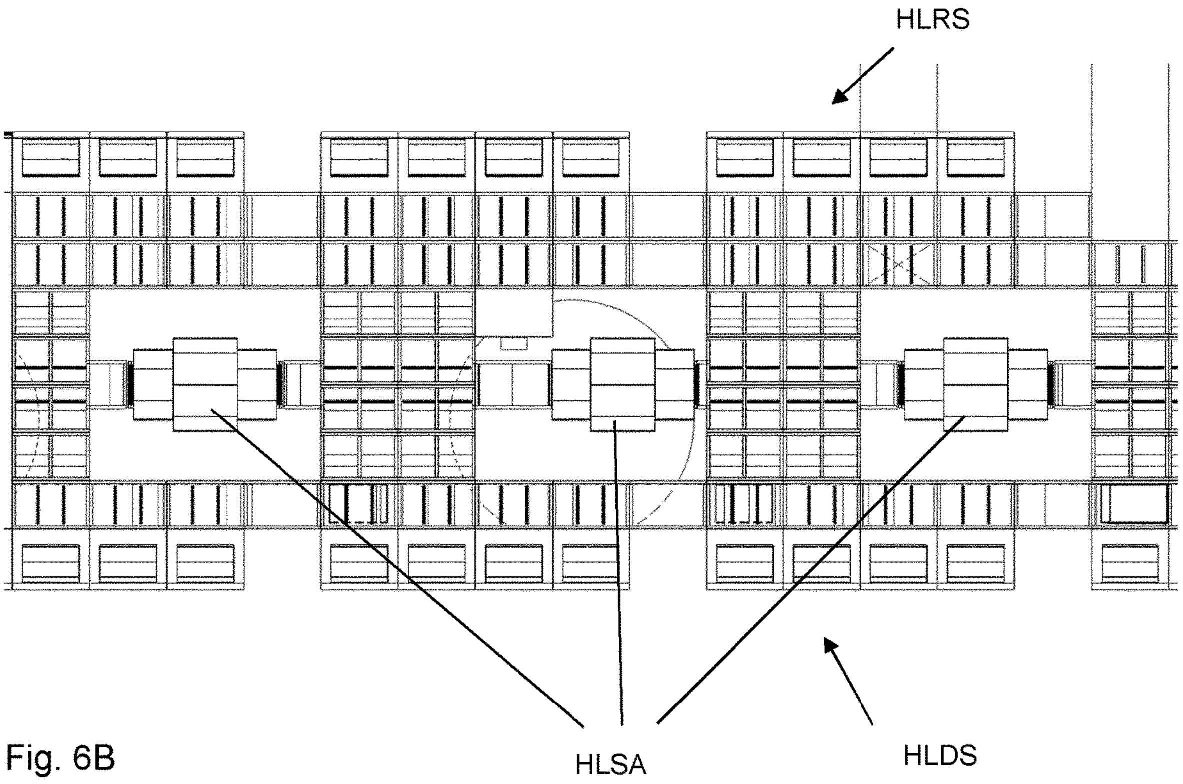

FIG. 6B depicts plural hand luggage screening apparatuses HLSA provided with plural hand luggage drop of stations HLDS and plural hand luggage reclaiming stations HLRS. Similarly to FIG. 6A, a conveyor connects the entries/exits of each one of the hand luggage screening apparatuses to the depositing stations and reclaiming stations. As the conveyor extends along each one of the hand luggage drop of stations and along each one of the hand luggage reclaiming stations, the hand luggage dropped off at the hand luggage drop off stations may be conveyed by the conveyor to any one of the hand luggage screening apparatuses, e.g. to a nearest one of the hand luggage screening apparatuses in case this hand luggage screening apparatus has sufficient screening capacity available. Thus, the hand luggage may be scanned by any one of the plural hand luggage screening apparatuses, enabling to increase an overall effective capacity, as excess hand luggage dropped off nearest to one of the hand luggage screening devices may be conveyed to another one of the hand luggage screening apparatuses. Similarly, the hand luggage, after having been scanned by one of the hand luggage screening apparatuses, may be conveyed to any one of the hand luggage reclaiming stations.

Figure 9:
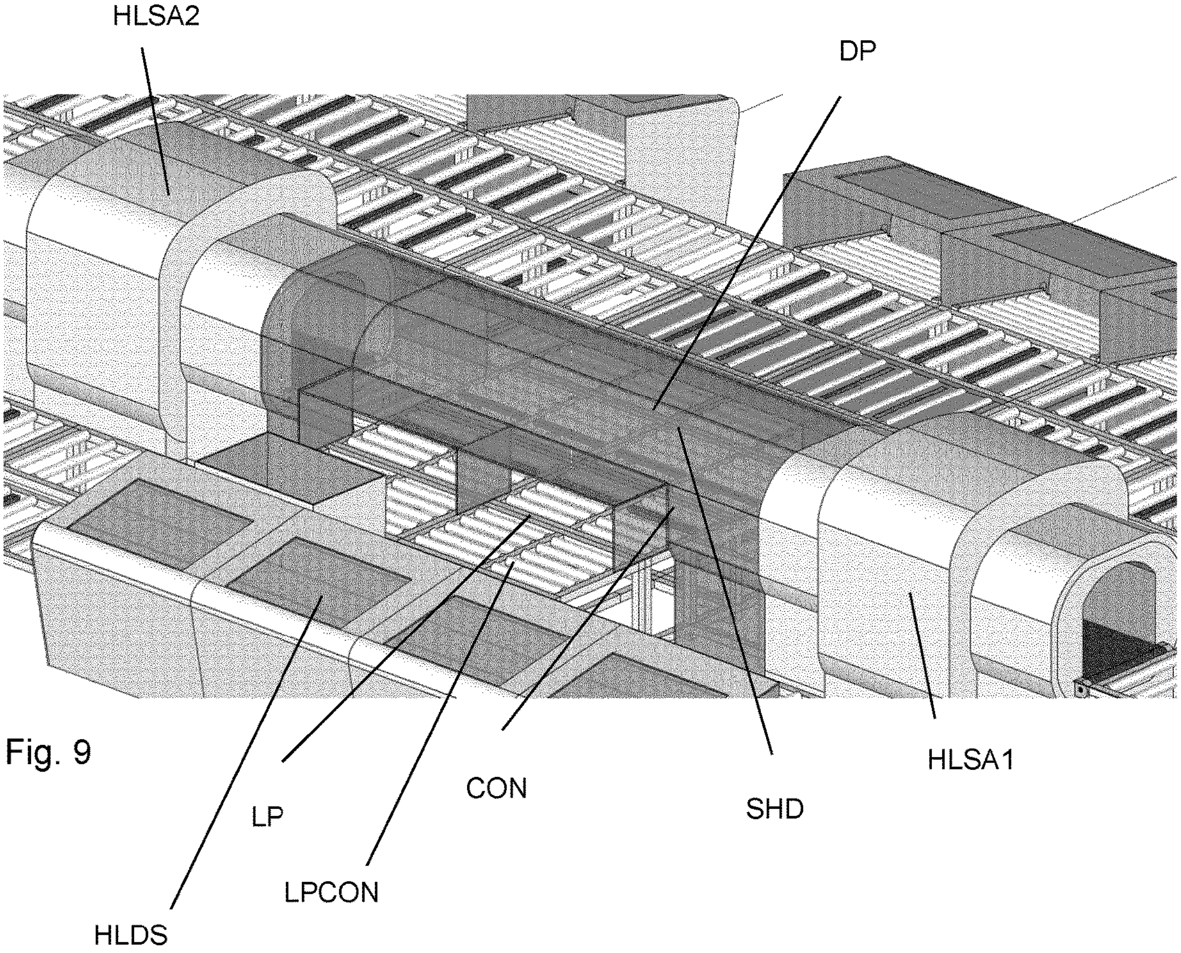
FIG. 9 depicts a side view of a hand luggage screening system.

FIG. 9 depicts dual hand luggage screening apparatuses HLSA1, HLSA2 whereby a conveyor CON in between them is provided with a shielding SHD to shield X-ray radiation. The conventions lead flaps that may interfere with the hand luggage conveying may be omitted. loading ports LP and exit ports DP having conveying directions LPCON that are perpendicular to the direction between the hand luggage screening apparatuses connect to the depositing HLDS and reclaiming stations and may be provided with lead curtains and loading port screens.

A screening system comprising the screening device may be provided, wherein the screening device is further configured to operate at at least two different detection rates.

a screening system detection rate may be defined, the screening system detection rate defining a required detection rate of the screening system;

one of the detection rates of the screening device may be selected to comply with the screening system detection rate; and instructions may be sent to the control device of the screening device to operate at the selected detection rate so as to comply with the screening system detection rate.

The detection rates of the screening device may define a detection rate of a security hazard to be detected at the person, the hand luggage and/or the footwear of the person.

The invention claimed is:

1. A screening device for screening a person, the screening device comprising:

a cabin comprising a wall at least partly enclosing an inner space;

a sensor on at least part of a surface of the wall facing the inner space, the sensor being configured to sense the person present in the inner space;

a projector projecting an image into the inner space to be viewed by the person; and a control device connected to the sensor and the projector and configured to:

operate the sensor to sense the person residing in the inner space; and drive the projector to project instructions to the person, associated with the operating of the sensor, wherein the projector is configured to project the image onto the wall of the cabin or into the inner space at least partly enclosed by the wall, and wherein the sensor on at least part of the surface of the wall comprises a radio wave scanner comprising a radio wave antenna array, the radio wave antenna array covering at least part of the surface of the wall behind the image projected by the projector.

2. The screening device according to claim 1, wherein the control device is further configured to:

derive a location of an object on the person from sensor data generated by the sensor; and control the projector to display the location of the object on the person.

3. The screening device according to claim 2, wherein the sensor further comprises a camera directed to a desired position of the person in the inner space, the camera being connected to the control device to transit image data to the control device, and wherein the control device is configured to generate a mirror image of the person from the image data, to create a fused image of the person by fusing the object at the derived location into the mirror image of the person and to control the projector to display the fused image of the person.

4. The screening device according to claim 1, wherein the screening device further comprises a camera configured to generate camera image data, a gesture sensor sensing a gesture of the person and configured to generate gesture data and a motion sensor recording a movement of the person and configured to generate motion data, wherein the control device is configured to perform a risk assessment from a combination of the sensor data, the camera image data, the gesture data and the motion data and to generate a warning message based on the risk assessment.

5. The screening device according to claim 4, wherein the control device is configured to perform the risk assessment using a self-learning system, the self-learning system having been trained using a training dataset additionally comprising operator assessment responsive to the sensor data, camera image data, gesture data and motion data.

6. The screening device according to claim 1, further comprising a footwear sensor on at least part of the surface of a floor of the cabin, the footwear sensor being configured to sense the person's footwear present in the inner space.

7. The screening device according to claim 6, wherein the control device is further configured to operate the footwear sensor to sense the footwear of the person, and to drive the projector to project instructions to the person, associated with the operating of the footwear sensor.

8. The screening device according to claim 1, wherein the control device is configured to:

establish a connection to an operator console;

output an instruction to an operator at the operator console to communicate to the person; and control the projector to display an image of the operator at the operator console.

9. The screening device according to claim 8, wherein the control device is configured to:

derive from the sensor data a location of an object on the person;

transmit the location of the object on the person to the operator console; and transmit instructions to the operator console requesting the operator to explain to the person the location of the object.

10. The screening device according to claim 8, wherein the control device is configured to output the instruction to the operator in case a criterion is fulfilled, the criterion comprising at least one of:

the person initiating an operator contact request;

the control device establishing that a pre-set screening time has elapsed; and the control device establishing that a presence of an object has been established.

11. The screening device according to claim 1, wherein the sensor comprises a radio wave scanner comprising a radio wave antenna array, the radio wave antenna array covering at least part of the surface of the wall behind the projected image.

12. The screening device according to claim 1, wherein the projector is configured to project a two dimensional image on the wall of the cabin or a three dimensional image in the inner space, wherein the control device comprises a sensor data processing device configured to process sensor data formed by radio wave signals and derive a sensor image therefrom, and an evaluation data processing device configured to evaluate the sensor image to identify any risks.

13. The screening device according to claim 1, further comprising an object depositing tray and wherein the instructions comprise instructions to deposit an object in the object depositing tray.

14. The screening device according to claim 13, further comprising a hand luggage screening apparatus, and a conveyor to convey a hand luggage from the cabin to the hand luggage screening apparatus, the control device being configured to drive the conveyor to convey the hand luggage deposited in the object depositing tray to the hand luggage screening apparatus, to drive the hand luggage screening apparatus to screen the hand luggage, and drive the conveyor to convey the hand luggage back into the cabin.

15. The screening device according to claim 13, wherein the screening device further comprises an identification device, the control device being configured to identify the person using identification data from the identification device, and associate the object depositing tray to the identified person.

16. The screening device according to claim 1, wherein the control device is configured to drive a display device to provide instructions to the person to adhere to a predetermined screening sequence.

17. The screening device according to claim 16, wherein the sensor further comprises the camera, the control device is configured to process an image form the camera to derive a progress of the screening of the person therefrom, to compare the derived progress of the screening to the predetermined screening sequence, and to derive the instructions provided to the person from the comparison of the derived progress to the predetermined screening sequence.

18. The screening device according to claim 1, further comprising a hand luggage screening apparatus configured to scan the hand luggage deposited by the person, wherein the hand luggage screening apparatus comprises a primary scanner and an X-ray diffraction scanner, and wherein the control device is configured to operate the hand luggage screening apparatus to:

scan the hand luggage by the primary scanner to generate primary scanner output data associated with the scan of the hand luggage;

determine an area of interest of the hand luggage from the primary scanner output data;

operate the X-ray diffraction scanner to scan the area of interest of the hand luggage to generate X-ray diffraction output data associated with the scan of the hand luggage by the X-ray diffraction scanner;

process the primary scanner output data and the X-ray diffraction output data to determine if an alarm signal is to be generated; and output the alarm signal if generated.

19. The screening device according to claim 1, further comprising:

a first identification station configured to request a person to present a token, token;

a hand luggage depositing station configured to collect hand luggage deposited by the person, the first identification station being associated with the hand luggage depositing station, a hand luggage screening apparatus configured to screen the hand luggage, luggage;

a hand luggage reclaiming station, downstream of the hand luggage screening apparatus, configured to reclaim the hand luggage deposited by the person;

a second identification station being associated with the hand luggage reclaiming station, the screening device forming a passage for the person from the hand luggage depositing station to the hand luggage reclaiming station; and a hand luggage conveying system configured to convey the hand luggage from the hand luggage depositing station via the hand luggage screening apparatus to the hand luggage reclaiming station, the control device further being configured to:

read the token presented by the person at the first identification station;

associate the presented token to the hand luggage deposited by the person at the hand luggage depositing station;

upon the person having been screened by the screening device, read the token presented by the person at the second identification station at the reclaiming station; and control the hand luggage conveying system to convey the hand luggage associated with the token to the hand luggage reclaiming station.

20. The screening device according to claim 19, further comprising plural hand luggage reclaiming stations, and wherein the control device is configured to designate one of the plural hand luggage reclaiming stations to the token, to control the hand luggage conveying system to convey the hand luggage associated with the token to the designated one of the plural hand luggage reclaiming stations and to output instructions to the person having passed the screening device and presenting the token to collect the hand luggage associated with the token at the designated one of the plural hand luggage reclaiming stations.

21. The screening device according to claim 19, wherein the screening device further comprises the object depositing tray and wherein the control device is configured to control the hand luggage conveying system to convey the object deposited in the object depositing tray to the designated one of the plural hand luggage reclaiming stations.

22. The screening device according to claim 19, comprising a hand luggage depositing station, a hand luggage reclaiming station, a first hand luggage screening apparatus, a second hand luggage screening apparatus and the hand luggage conveying system to convey the hand luggage from the hand luggage depositing station to either one of the first and the second hand luggage screening apparatuses and from to either one of the first and the second hand luggage screening apparatuses to the hand luggage reclaiming station, wherein the conveying system comprises a shielded hand luggage conveying path extending between the first and second hand luggage screening apparatuses, wherein the hand luggage depositing station loads into the shielded hand luggage conveying path via a loading port having a conveying direction perpendicular to a loading conveying direction between the first and second hand luggage screening apparatuses, wherein the shielded hand luggage conveying path discharges to the hand luggage reclaiming station via a discharging port having a discharging conveying direction perpendicular to a conveying direction between the first and second hand luggage screening apparatuses and wherein radiation shields configured to shield radiation generated by the first and second hand luggage screening apparatuses are arranged at the loading port and at the discharging port.

23. The screening device according to claim 22, wherein the radiation shields are lead curtains.

24. The screening device according to claim 22, wherein shielding flaps at the first and second hand luggage screening apparatuses are omitted.

25. The screening device according to claim 22, wherein the loading port comprises a loading port shield extending along the loading direction and wherein the discharging port comprise a discharging port shield extending along the discharging direction.

26. The screening device according to claim 22, wherein the first and second hand luggage screening apparatuses are bi-directional and wherein the shielded hand luggage conveying path is bi-directional.

27. A method of operating a screening system comprising the screening device according to claim 1, wherein the screening device is further configured to operate at at least two different detection rates, the method comprising:

defining a screening system detection rate, the screening system detection rate defining a required detection rate of the screening system;

selecting one of the detection rates of the screening device to comply with the screening system detection rate; and sending instructions to the control device of the screening device to operate at the selected detection rate so as to comply with the screening system detection rate.

28. The method according to claim 27, wherein the detection rates of the screening device define a detection rate of a security hazard to be detected at the person, the hand luggage and/or the footwear of the person.

29. The screening device according to claim 1, wherein the control device is further configured to derive a location of an object on the person from sensor data generated by the sensor, and control the projector to display the location of the object on the person and to instruct the person present in the inner space to remove the object.

30. A screening device for screening a person, the screening device comprising:

a cabin comprising a wall at least partly enclosing an inner space, a sensor on at least part of the surface of the wall facing the inner space, the sensor being configured to sense the person present in the inner space, a projector projecting an image into the inner space to be viewed by the person, and a control device connected to the sensor and the projector and configured to:

operate the sensor to sense the person residing in the inner space;

drive the projector to project instructions to the person, associated with the operating of the sensor, wherein the control device is configured to establish a connection to an operator console, output an instruction to an operator at the operator console to communicate to the person, and control the projector to display an image of the operator at the operator console.

31. The screening device according to claim 30, wherein the projector is configured to project the image onto the wall of the cabin or into the inner space at least partly enclosed by the wall, and wherein the sensor on at least part of the surface of the wall comprises a radio wave scanner comprising a radio wave antenna array, the radio wave antenna array covering at least part of the surface of the wall behind the image projected by the projector.

32. The screening device according to claim 31, wherein the control device is further configured to derive a location of an object on the person from sensor data generated by the sensor, and control the projector to display the location of the object on the person and to instruct the person present in the inner space to remove the object.

* * * * *